United States Patent
Brune et al.

(10) Patent No.: US 7,072,646 B1
(45) Date of Patent: Jul. 4, 2006

(54) METHOD OF DISTRIBUTING KEYS TO SUBSCRIBERS OF COMMUNICATIONS NETWORKS

(75) Inventors: Peter Brune, Meckenheim (DE); Andreas Sasse, Hennef (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/936,420

(22) PCT Filed: Mar. 13, 2000

(86) PCT No.: PCT/DE00/00752

§ 371 (c)(1),
(2), (4) Date: Jan. 18, 2002

(87) PCT Pub. No.: WO00/56101

PCT Pub. Date: Sep. 21, 2000

(30) Foreign Application Priority Data

Mar. 12, 1999 (DE) ................................ 199 11 221

(51) Int. Cl.
*H04Q 7/20* (2006.01)
(52) U.S. Cl. ....................... 455/417; 455/411; 455/418; 455/419; 380/278; 380/281; 380/282; 380/285
(58) Field of Classification Search ................ 455/410, 455/411, 422, 466, 557, 417, 418, 419; 380/25, 380/49, 277, 278, 46, 43, 247, 30; 713/168, 713/171, 182
See application file for complete search history.

(56) References Cited

U.S. PATENT DOCUMENTS

| 5,233,656 | A | * | 8/1993 | Langrand et al. | 380/248 |
| 5,237,612 | A | * | 8/1993 | Raith | 380/247 |
| 5,850,445 | A | * | 12/1998 | Chan et al. | 380/247 |
| 6,026,293 | A | * | 2/2000 | Osborn | 455/411 |
| 6,075,860 | A | * | 6/2000 | Ketcham | 713/159 |
| 6,078,908 | A | * | 6/2000 | Schmitz | 705/50 |
| 6,111,955 | A | * | 8/2000 | Mizikovsky et al. | 380/278 |
| 6,230,002 | B1 | * | 5/2001 | Floden et al. | 455/411 |
| 6,338,140 | B1 | * | 1/2002 | Owens et al. | 713/168 |
| 2004/0240671 | A1 | * | 12/2004 | Hu et al. | 380/277 |

* cited by examiner

*Primary Examiner*—Joseph Feild
*Assistant Examiner*—Julio Perez
(74) *Attorney, Agent, or Firm*—Cooper & Dunham LLP

(57) ABSTRACT

The invention relates to a method for distributing keys to subscribers in communications networks, in particular digital mobile radio networks. These keys are required, for example, for access to added value services. In this case, there is a problem in distributing the keys securely and, above all, in an uncomplicated manner, to the subscribers.

According to the invention, this is achieved by the keys being generated, and possibly stored if required, in a security device provided at the mobile radio network end and, on request by a subscriber, by at least one key being requested from the security device, being allocated to the subscriber, and being transmitted via the mobile radio network to the subscriber's mobile station.

13 Claims, No Drawings

METHOD OF DISTRIBUTING KEYS TO SUBSCRIBERS OF COMMUNICATIONS NETWORKS

The invention relates to a method for distributing keys to subscribers in communications networks, in particular digital mobile radio networks, as claimed in the pre-characterizing clause of the independent patent claim. These keys allow the user of a terminal to, for example, authenticate himself to an added value service node in the communications network.

At the moment, a subscriber to telecommunications services authenticates himself for access to added value service nodes, such as a mobile box, by entering a password and user name. In this case, the mobile subscriber telephone number (MSISDN) is generally transmitted as the user name by signaling in GSM mobile radio networks, without there being any explicit input by the user.

The allocation and use of the password (which in this context has the same meaning as a key) is a critical process since misuse can cause considerable damage if it is undesirably disclosed or the user is deliberately spied on. New passwords are thus frequently sent by registered letter which, organizationally and technically, involves considerable effort and, at the same time, a time delay before the user receives a password.

If, furthermore, the added value service node is accessed via networks that are not secure, such as the Internet, there is a risk of the user name and password being monitored without authorization, and being misused.

DE-A-197 18 103 discloses a method for authentication in data transmission systems, in which, on request by a subscriber, a key is generated in the form of a transaction number (TAN) by an authentication computer provided in the data transmission system, or is selected from a file. The key is transmitted from the authentication computer to the subscriber, where it can be used directly by the subscriber for authentication to the authentication computer. The distribution of a number of keys which can be used by the subscriber as required is not disclosed in this document.

The object of the invention is to specify a method using which keys can be distributed automatically to communications network subscribers using secure means.

According to the invention, this object is achieved by the characterizing features of the independent patent claim.

The essence of the invention is that the keys are generated, and may be stored if required, in a security device provided at the mobile radio network end, and in that on request by a subscriber, at least one key is requested from the security device, is allocated to the subscriber, and is transmitted via the mobile radio network to the subscriber's mobile station or terminal, with the transmitted key being allocated to that subscriber and being stored in the terminal and/or a subscriber identity module (SIM) in the mobile station for further use.

The described method is particularly suitable for distributing keys automatically to mobile terminals by secure means in a GSM or UMTS network, and for storing them on the subscriber's (U)SIM. A terminal user can use these keys to authenticate himself to an added value service node. The (U)SIM provides a protected-access medium in order to check passwords or keys, to store them and, when required, to use them for authentication, from a mobile radio network.

Electronic and secure distribution and the automation resulting from this result firstly in a considerable reduction in effort and gain in time compared to conventional key distribution methods, which are generally based on receipted written communications. Secondly, the automated sequence, and hence the exclusion of human activities from key generation and distribution lead to an improvement in security.

Simple distribution furthermore allows more frequent distribution of keys with little effort. This also allows the use of simple authentication methods for access to added value service nodes in a telecommunications network, in which, for example, a specific key is used only once.

The authorized (U)SIM user can use the capability of transferring the key to other terminals and/or of accessing added value service nodes using the mobile terminal or other terminals via Internet, PSTN or ISDN. The authentication method between the terminal and the added value service node and the transfer of a key from the mobile terminal to another terminal can be achieved using existing algorithms, and is not the subject matter of the invention.

A first embodiment variant of the invention provides for the user to use a short message (SMS) to call for a new key when required. To do this, he sends a short message with specific contents to a destination address, which is defined in advance by the network operator and is associated with a security device. In response, he receives a password in plain text back from this address. The user can now use this password to authenticate himself to an added value service node.

A second embodiment variant of the invention, which has a higher security level, provides for all the communications processes between the mobile station and the security device to be encrypted using an end-to-end encryption method by using a program on the (U)SIM (card application), which acts as the client to communicate with the mobile radio network. The program advantageously allows the user to be offered a menu-controlled interface on the mobile terminal, by means of which keys can be called up and managed.

In order to request a key, the user, for example, selects an appropriate menu item on his terminal. The mobile radio network responds with an encrypted message, which is sent directly to the card application. The card application stores the key in a protected memory area in the (U)SIM.

To authenticate himself to an added value service node, the user selects an appropriate menu item, for example, after entering a PIN. Depending on the authentication algorithm:

either the key is displayed in plain text and can be reused by the user;

the key is transmitted directly to the added value service node; or the key is transferred to another terminal, where it can be reused.

Advantageous refinements and developments of the invention are specified in the dependent patent claims.

The invention will be described in more detail in the following text using an example and with reference to a drawing figure. Further features and advantages of the invention are disclosed in the example, the drawing and its description.

FIG. 1 shows an illustration of the systems involved in carrying out the method.

The mobile station 3, which comprises a terminal 4, has, in a known manner, the (U)SIM 5, in which the keys for user authentication are stored. The security device comprises a security server 9, which produces the keys using an algorithm selected by the operator, stores them in a data bank 10, and distributes the keys on request 1 from a subscriber to the (U)SIM 5 and to the added value service nodes 11 which can be used by that subscriber.

The short message service center 8 in the mobile radio network 7 transmits the keys in the form of short messages (SM) 2 between the security server 9 and the mobile station 3. This is shown only by way of example. GPRS nodes, for example, can also be used as transmission devices.

On the basis of a first security level used in the method according to the invention, the subscriber requests a key via his mobile station 3 by means of a short message 1.

The security server 9 evaluates the request by checking the transmission address (MSISDN) of the subscriber for authorization, and sends the key or keys in a short message 2 to the mobile station 3, where it or they is or are stored on the (U)SIM 5. Furthermore, the security server 9 sends the key to one or more added value service nodes 11. This completes the key distribution process. Depending on the chosen terminal 4 and access means (mobile radio, ISDN, Internet, etc.), the user can now authenticate himself to the added value service node 11.

With this low, first security level, the key distribution security is based on the protection against monitoring in the GSM/UMTS network and user identification by means of the MSISDN. Once they have been stored on the (U)SIM, the keys are protected by means of the standard PIN.

In the second, higher security level, the SIM Application Toolkit (SAT) in accordance with GSM 11.14 can be used. This is done by entering an SAT application in the (U)SIM 5, which communicates using this client-server configuration with the security server 9 via the GSM or UMTS network 7.

The user uses the menu on his terminal 4 to request keys via the SAT application. To do this, he must identify himself to the (U)SIM 5 using a second PIN which, for example, he enters via the keypad on the terminal 4. The SAT application then sends an encrypted request 1 to the security server 9, which processes the request. The security server 9 checks that the encrypted request is real, on the basis of the encryption and the address from which it was sent (MSISDN).

If the check result is positive, the security server 9 produces the key or keys for the user and sends it or them back to the SAT application in the (U)SIM 5. The SAT application receives the keys and stores them in a specially protected area in the (U)SIM 5. Furthermore, the security server 9 sends the key to one or more added value service nodes 11.

The keys can in turn be accessed under menu control by entering a PIN via the card application, which indicates an unused key on the display on the terminal 4 and, if desired, stores it in an unprotected SIM card memory area. From there, this key can be read to a PC/laptop by means of standard access software, for example by means of a smartcard reader or infrared interface in the GSM/UMTS terminal.

Alternatively, and depending on the security requirement, the key can also remain concealed from the user and can be transmitted in confidential form between the (U)SIM 5 and the added value service nodes 11, and/or from the (U)SIM 5 to the laptop/PC for later use.

One particular characteristic feature of the second security level is additional encryption of the short messages 1, 2 exchanged between the security server 9 (server SW) and the software in the (U) SIM (client SW). This provides end-to-end security between the server SW and the client SW. In this case, the user preferably has no knowledge of the keys required for this purpose. Standard methods, such as triple DES or RSA, can be used as encryption algorithms between the client and server.

The keys required for additional encryption are entered once during personalization of the (U)SIM and are loaded in the security server.

DRAWING LEGEND

1 Signal flow: request key
2 Signal flow: load key
3 Mobile station
4 Terminal
5 (U)SIM
6 Air interface
7 Mobile radio network
8 Short message service center
9 Security device (server)
10 Data bank
11 Added value service node

The invention claimed is:

1. A method for distributing keys to subscribers in digital mobile radio networks, comprising the steps of:
   generating the keys in a security device provided at the mobile radio network end;
   requesting at least one key from the security device;
   transmitting the at least one key via the mobile radio network to a mobile station or a terminal of a subscriber based on the request; and
   setting up a SIM application toolkit (SAT) application in the SIM in the mobile station, wherein the SAT application carries out additional end-to-end encryption of the key transmitted between the mobile station and the security device, wherein
   the generated keys are stored in the security device prior to transmission;
   the requesting step is performed by the subscriber;
   the transmitted key is allocated to the subscriber; and
   the transmitted key is stored in the terminal and/or in a subscriber identity module (SIM) in the mobile station.

2. The method of claim 1, wherein the transmitted key is stored in a protected memory area in the SIM.

3. The method of claim 1, wherein the key is transmitted via a traffic channel in the mobile radio network.

4. The method of claim 1, wherein the key is transmitted in the form of a short message (SM) via a signaling channel in the mobile radio network.

5. The method of claim 1, wherein when the key is requested, the subscriber's authorization is checked by evaluating a mobile subscriber telephone number (MSISDN) for the subscriber.

6. The method of claim 1, wherein the security device sends the key which is transmitted to the subscriber to one or more added value service nodes.

7. A method for distributing keys to subscribers in digital mobile radio networks, comprising the steps of:
   generating the keys in a security device provided at the mobile radio network end;
   storing the generated keys in the security device prior to transmission
   requesting, by the subscriber, at least one key from the security device; and
   transmitting the at least one key via the mobile radio network to a mobile station or a terminal of a subscriber based on the request, wherein
   the transmitted key is allocated to the subscriber;
   the transmitted key is stored in the terminal and/or in a subscriber identity module (SIM) in the mobile station; and the security device sends the key which is transmitted to the subscriber to one or more added value service nodes.

8. The method of claim 7, wherein a SIM application toolkit (SAT) application is set up in the SIM in the mobile station, and the SAT application carries out additional end-to-end encryption of the key transmitted between the mobile station and the security device.

9. The method of claim 8, wherein before using the SAT application, the subscriber is identified to the SIM by entering a personal identification number (PIN).

10. The method of claim 7, wherein the transmitted key is stored in a protected memory area in the SIM.

11. The method of claim 7, wherein the key is transmitted in the form of a short message (SM) via a signaling channel in the mobile radio network.

12. The method of claim 7, wherein when the key is requested, the subscriber's authorization is checked by evaluating a mobile subscriber telephone number (MSISDN) for the subscriber.

13. The method of claim 7, wherein the key is transmitted via a traffic channel in the mobile radio network.

* * * * *